Jan. 6, 1942.    T. H. THOMPSON    2,268,784
VEHICLE SPRING LINER
Filed Aug. 25, 1939

INVENTOR.
Tom H. Thompson
BY Bates, Golrick, & Teare
ATTORNEYS

Patented Jan. 6, 1942

2,268,784

UNITED STATES PATENT OFFICE 2,268,784

VEHICLE SPRING LINER

Tom H. Thompson, Akron, Ohio

Application August 25, 1939, Serial No. 291,911

9 Claims. (Cl. 267—47)

This invention is directed to improvements in spring liners, and is particularly concerned with liners or inserts utilizable in leaf spring assemblies for automotive use. The present application is a continuation in part of my pending application for Letters Patent Serial No. 186,571, filed January 24, 1938, now Patent No. 2,175,230, having issued October 10, 1939.

In my prior patents and applications I have set forth the advantages to be obtained through the incorporation, in automotive spring assemblies of the leaf spring type, of elongated strips of material between the respective spring leaves, to control the friction factor of the spring assembly when the same becomes subjected to loads and usage in a vehicle. Satisfactory results were obtained by the use of materials of certain classes, as set forth in said patents and patent applications. However, the advantages of having inserts, which extend substantially throughout the length of the respective spring leaves comprising the spring assemblage, have been offset somewhat in a commercial sense, by the quantity of the materials required and the costs thereof. To separate, economically, each spring leaf properly from the adjacent spring leaves by the use of such inserts requires that the materials used therein be of low cost and be processed in such manner as to efficiently fulfill the intended functions. Wherefore, the general object of the present invention is to derive a spring insert or liner construction, whereby the inserts can be economically produced while obtaining the advantages of durability under varying loads and weather conditions, and which will function to produce a predetermined, constant, friction factor control in the spring assembly after the same has been placed in use.

A further object of the present invention is to provide a liner structure, wherein the outer end portions of the liner which are subjected to the greater wear and exposure are constructed in such manner as to increase the strength thereof without interfering with the desired friction control functioning of the liner.

Another object of the present invention is to provide a liner structure, the ends of which will be so constructed as to retain the liner in position between the spring leaves.

Figure 1:
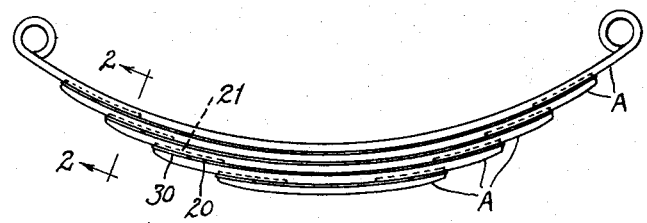
Figure 2:
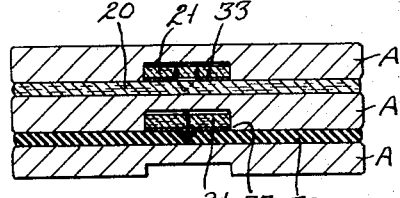
Figure 3:
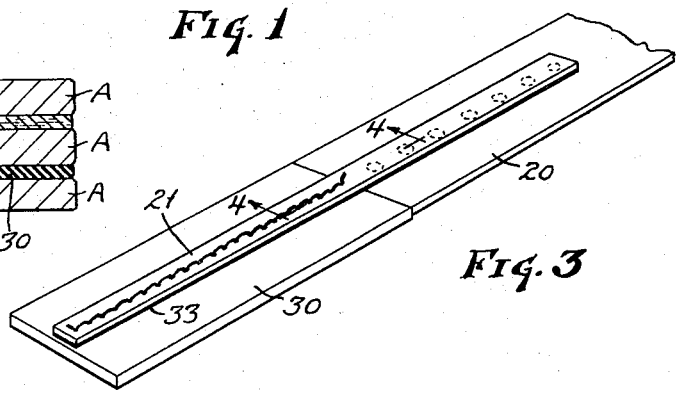
Figure 4:
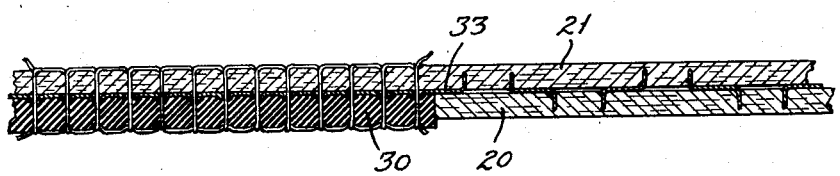
Figure 7:
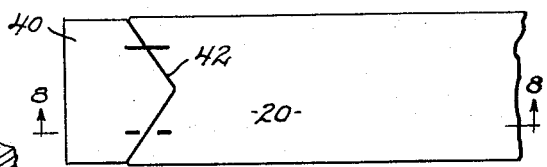
Figure 5:
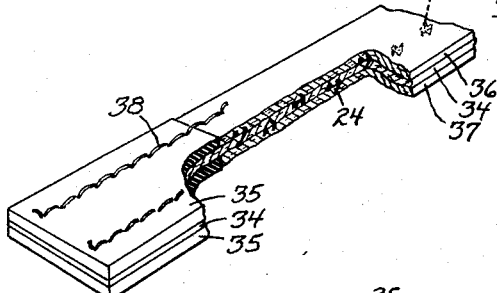
Figure 8:
Figure 6:
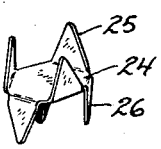

In the drawing, Fig. 1 is a side elevation of a leaf spring assembly incorporating certain features of my invention; Fig. 2 is a cross-sectional view of three grooved leaf springs with inserts disposed therebetween and taken substantially along the line 2—2 of Fig. 1; Fig. 3 is a perspective view of one embodiment of my invention for use in combination with a spring assembly, wherein the spring laminations are grooved; Fig. 4 is a cross-sectional view taken substantially along the line 4—4 of the liner construction shown in Fig. 3; Fig. 5 is a fragmentary perspective view of another liner construction provided with a resilient means at the end portion thereof, certain parts of the liner being broken away to more clearly illustrate the internal construction thereof; Fig. 6 is a perspective view of a bonding clip for the laminations; Fig. 7 is a plan view of a modified form of liner construction; and Fig. 8 is a cross-sectional view taken substantially along the line 8—8 of Fig. 7.

The liners with which the present invention is concerned may extend the full length of the spring assembly, as illustrated in the drawing, or they may be inserted in pairs between the outer ends of adjacent spring leaves. The end portions, or at least those portions of the liners adjacent the ends of the spring leaves are constructed and treated in such manner as to withstand long wear under varying weather conditions.

I have found that liners constructed as generally disclosed in my Patent No. 2,105,869, issued January 18, 1938, lack somewhat in tensile strength and durability at the outer end portions thereof, due to sand and small stone abrasions and weather influences. I have overcome this disadvantage by utilizing at the liner end or tip portions, a protective means which will not interfere with the functioning of the liner in producing a predetermined friction factor control. Such a protective means may comprise a strip of relatively compressable material which is applied to or formed on the liner end portions. Such material may comprise rubber, a rubber substitute or any compressable material, preferably one which is resilient, and the compounding of which can be controlled in such manner as to produce a suitable surface which will not interfere with the desired controlling of the friction factor of the liner.

In the drawing and following specification I have disclosed such a protective means in the form of rubber or similar compressable end portions for the liners, which end portions are either permanently secured to the liner, or so secured that the end portions will be retained in position relative to the liner by the securing means, at least until the liner has been positioned in the spring assembly.

I have illustrated in the drawing an embodiment of spring insert or liner construction utilizable in spring assemblies, wherein the spring leaves are grooved, such grooved springs being shown in Figs. 1 and 2. I have also illustrated in the drawing a form of liner construction, utilizable in spring assemblies wherein the spring leaves are not grooved, such liner being shown in Fig. 5.

In Fig. 1 I show a liner or spring insert, the body of which comprises an elongated strip of material 20, preferably formed of a fibrous material such as a low-grade paper board stock, less than a tenth of an inch in thickness and of a width substantially equal to the width of spring leaves A. I obtain in these liner constructions, characteristics which can be controlled or varied to obtain a constant friction factor of any desired specification, the latter being dependent partially upon the load rating of the spring. The materials forming the strip 20 may be treated with a mixture of paraffin, montan wax and diphenyl, the montan wax being used to increase the melting point of the paraffin and to add strength to the paper stock. When the liner is to be used in connection with grooved springs, I attach an additional lamination or laminations in the form of rib members 21 to the upper face of the liner body adjacent the ends thereof, or, if desired, entirely along the center thereof, whereby the ribs, when secured to the liner, will fit into the grooves of the leaf springs adjacent the ends of the respective spring leaves.

I prefer to have the rib ends terminate slightly inwardly from the ends of the liner 20, when the liners are to be used in spring assemblies wherein the grooved spring leaf ends are of tapering depth. The ribs 21 may be secured to the liner lamination 20 by stitching or stapling. However, I may use preformed metallic binding clips 24, such as is illustrated in Fig. 6. These binding clips may comprise cold rolled steel about ten-thousandths of an inch in thickness and of a width somewhat less than the width of the rib or ribs 21. As shown in Fig. 6, the metal binding clip 24 has formed thereon upwardly and downwardly extending clusters of prongs 25 and 26, respectively, which, when the laminations 20 and 21 are assembled, cut into the laminations and serve as a bond for said laminations, the binding clips 24 being placed between the laminations at the time of assembly.

As heretofore mentioned, the present invention is especially concerned with a construction wherein the ends of the liner are provided with resilient members, preferably formed of compressible rubber, and of such length as to be disposed intermediate the end portion of a spring leaf and the flat face of an adjacent spring leaf. In Fig. 1 it will be noted that the liner body or main portion 20 preferably extends for the major portion of the length of the spring leaf, and end sections 30 are of substantially the same thickness as the liner member 20 and are formed of resilient material. As the construction shown in Fig. 3 is adapted for use with grooved springs, I find it convenient to secure the resilient section to the liner section 20 by the lamination or rib member 21, heretofore described. The lamination or rib 21 is shown as being secured to the liner member 20 by a bonding strip 33. That portion of the bonding strip disposed between the rib or lamination 21 and the liner member 20 may be provided with the prong formations, similar to those hereinbefore described in connection with Fig. 6, while that portion of the bonding strip 33, which is disposed between the rib member 21 and the resilient section 30 may be stitched to the respective members, as shown in Fig. 4.

In Fig. 5 I show a modified form of liner structure. In this construction the liner is built up of a plurality of laminations comprising a central lamination 34 formed of any suitable material, two exposed end portion laminations 35 formed of a relatively resilient material such as rubber, and two outer laminations 36 and 37 of substantially the same thickness as the rubber laminations.

The rubber laminations 35 may be secured to the central lamination 34 by any suitable means, such as stitching 38, and the outer laminations 36 and 37 may be secured to the central lamination 34 by stitching, stapling or other bonding medium, but preferably by bonding clips, such as is shown in Fig. 6.

I have found that in practice that the resilient or compressible end section of the liner may be temporarily secured to the main section thereof. The only requirement being that the attaching means used be of such a nature that it will retain the end section of the liner attached to the body section thereof until the liner has been placed in a spring assembly. Thus, thin strips of adhesive surfaced paper or fabric may be used to secure the end section to the body section, or as shown in Fig. 7 merely sufficient staples to effect a temporary attachment of the sections, one to the other. However, in any case the securing means should be such that it will not interfere with the function of the liner.

The construction illustrated in Fig. 7 is especially adapted for use with liners using a temporary securing means. In this construction the compressible end section not only serves to protect the end of the liner, but is particularly adapted to retain the liner in position between adjacent spring leaves. As there shown, the end section 40 of the liner is slightly thicker than the main section 20 thereof, so that the surface adherence between such section and the contacting spring leaves is relatively great.

In Figs. 3 and 5, the rib 21 and lamination 34, respectively, are secured to their respective end and body liner sections and thus serve to enable the compressible section of the respective liners to restrain the main liner sections against sidewise movement after they are placed in a leaf spring assembly. In the construction illustrated in Fig. 7, the end section 40 has an interlocking relation to the main liner section 20. As illustrated, the end of the liner has a V shaped notch 42 and the end of the section 40 has a complimentary shape. Thus, the end section 40 will restrain the body section 20 of the liner against sidewise movement when the liner has been positioned in a spring assembly without requiring assistance of the means used to attach the end section to the main section of the liner. This construction greatly facilitates the use of a temporary attaching means for securing the two sections of the liner together.

I claim:

1. A spring liner for leaf springs comprising a strip of fibrous, relatively non-compressible material having a width substantially the width of the leaf springs between which the liner is adapted to be placed, and a section of relatively compressible material joined to said elongated strip of relatively non-compressible material and in planular relation thereto, and means securing the two sections together comprising a lamination of non-compressible material, whereby when the liner is placed between the spring leaves in final assembly, the compressible sections of the spring liner together with a lamination of non-compressible material will be disposed adjacent to and at the ends of the respective spring leaves comprising the assembly.

2. An automotive spring liner for leaf springs comprising a strip of fibrous, relatively non-compressible material having a width substantially the width of the leaf springs between which the liner is adapted to be placed, and a section of relatively compressible material joined to said elongated strip of relatively non-compressible material and a bridging member extending centrally of both sections and forming a rib which is longitudinally secured to both liner sections.

3. A spring liner of the class specified, having a main part formed of non-compressible material and an end part formed of laminations of compressible and non-compressible materials, and means securing the two sections together, whereby when the liner is placed between the spring leaves in final assembly, the laminated compressible part of the spring liner will be disposed adjacent to and at the ends of the respective spring leaves comprising the assembly.

4. The combination of a plurality of grooved spring leaves forming an elliptic spring assembly, spring liners disposed between at least some of the spring leaves, said liners comprising elongated strips of relatively non-compressible material disposed between the spring leaves and laminations of relatively compressible material covering the top and bottom end portions of the liner, said laminations being of such thickness that the thickness of the liner is uniform substantially throughout its length.

5. An automotive spring liner for leaf springs comprising laminations of relatively non-compressible material having a width substantially the width of the leaf springs between which the liner is adapted to be placed, one of said laminations being equal to or greater in length than a spring leaf with which it is to be operatively associated outwardly exposed, sections of relatively compressible material joined to end portions of said elongated strip and of a thickness substantially equal to the thickness of the other laminations forming the liner, and means for securing all of said laminations together.

6. A spring liner of the class specified having a main part formed of laminations of non-compressible material and an end part formed of pressible laminations of outwardly exposed compressible material in laminated relation to one of the laminations of the non-compressible material, and means securing the last two-named laminations together, whereby when the liner is placed between the spring leaves in final assembly, the compressible laminations of each of the spring liners will be disposed adjacent to and at the ends of the respective spring leaves comprising the assembly.

7. The combination of a plurality of grooved spring leaves forming an elliptic spring assembly, spring liners disposed between at least some of the spring leaves, said liners comprising elongated strips of relatively non-compressible material disposed between the spring leaves and sections of relatively compressible material forming the bearing surfaces of the end portions of the liners, and a strip of material forming a rib secured to said liner and adapted to be disposed to lie within the groove formations of said spring leaves 8. An automotive spring liner for leaf springs comprising an elongated strip of fibrous, relatively non-compressible material having a width substantially the width of the leaf springs between which the liner is adapted to be placed, sections at the ends of the strip of relatively compressible material and of substantially the same width but of shorter length than the strip, and readily destructible elements temporarily securing the compressible sections to the ends of the strip and adapted to facilitate handling of the liner and to retain the compressible material attached to the non-compressible material until the liner is inserted between the spring leaves.

9. A spring liner of the class specified, having a main part formed of non-compressible fibrous material and an end part formed of rubber, and means securing the two sections together, whereby when the liner is placed between the spring leaves in final assembly, the rubber sections of the spring liner will be disposed adjacent to and at the ends of the respective spring leaves comprising the assembly, and wherein said rubber sections are thicker than the fibrous sections, thus insuring their remaining under compression when in use in a spring assembly.

TOM H. THOMPSON.